(12) United States Patent
Filippov et al.

(10) Patent No.: US 11,483,554 B2
(45) Date of Patent: Oct. 25, 2022

(54) INTRA-PREDICTION APPARATUS, ENCODING APPARATUS, DECODING APPARATUS AND METHODS FOR NON-SQUARE VIDEO CODING BLOCKS

(71) Applicant: Huawei Technologies Co., Ltd., Shenzhen (CN)

(72) Inventors: Alexey Konstantinovich Filippov, Moscow (RU); Vasily Alexeevich Rufitskiy, Moscow (RU)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/135,076

(22) Filed: Dec. 28, 2020

(65) Prior Publication Data

US 2021/0152818 A1    May 20, 2021

Related U.S. Application Data

(63) Continuation of application No. PCT/RU2018/000431, filed on Jun. 29, 2018.

(51) Int. Cl.
*H04N 19/11* (2014.01)
*H04N 19/146* (2014.01)
(Continued)

(52) U.S. Cl.
CPC ......... *H04N 19/11* (2014.11); *G06F 1/03* (2013.01); *H04N 19/146* (2014.11); *H04N 19/159* (2014.11); *H04N 19/176* (2014.11)

(58) Field of Classification Search
CPC ........ G06F 1/03; H04N 19/105; H04N 19/11; H04N 19/134; H04N 19/146;
(Continued)

(56) References Cited

U.S. PATENT DOCUMENTS

2017/0353730 A1   12/2017  Liu et al.
2019/0174128 A1*   6/2019  Jang .................. H04N 19/11
(Continued)

FOREIGN PATENT DOCUMENTS

CN    110115034 A    8/2019
CN    110115035 A    8/2019
(Continued)

OTHER PUBLICATIONS

Cao, X. et al., "Short Distance Intra Coding Scheme for High Efficiency Video Coding," IEEE Transactions on Image Processing, vol. 22, No. 2, Feb. 2013, 12 pages.
(Continued)

*Primary Examiner* — Francis Geroleo
(74) *Attorney, Agent, or Firm* — Slater Matsil, LLP

(57) ABSTRACT

A device and method for intra-predicting a rectangular and non-square video coding block, the device including an intra-prediction apparatus configured for intra-predicting a rectangular and non-square video coding block according to a set of directional intra-prediction modes distributed over a set of directional ranges, where the intra-prediction apparatus being configured for configured for intra-predicting the rectangular and non-square video coding block includes the intra-prediction apparatus being configured to select a directional range from the set of directional ranges, and determine a number of directional intra-prediction modes of the selected directional range according to a size of a block.

20 Claims, 18 Drawing Sheets

(51) Int. Cl.
*H04N 19/159* (2014.01)
*H04N 19/176* (2014.01)
*G06F 1/03* (2006.01)

(58) Field of Classification Search
CPC .... H04N 19/159; H04N 19/176; H04N 19/46; H04N 19/593
See application file for complete search history.

(56) References Cited

U.S. PATENT DOCUMENTS

| | | | | |
|---|---|---|---|---|
| 2019/0208201 A1* | 7/2019 | Yasugi | ............ | H04N 19/105 |
| 2020/0029076 A1* | 1/2020 | Sharman | ............ | H04N 19/139 |
| 2021/0014487 A1* | 1/2021 | Choi | ............ | H04N 19/593 |

FOREIGN PATENT DOCUMENTS

| | | | | |
|---|---|---|---|---|
| CN | 110115036 A | | 8/2019 | |
| EP | 2384003 A1 | | 11/2011 | |
| EP | 2745519 A1 | | 6/2014 | |
| EP | 2745519 B1 | * | 9/2017 | ........... H04N 19/136 |
| KR | 20130029695 A | | 3/2013 | |
| WO | 2013023518 A1 | | 2/2013 | |
| WO | 2013039908 A2 | | 3/2013 | |

OTHER PUBLICATIONS

Kai, H.H. et al., "EE2.1: Quadtree Plus Binary Tree Structure Integration with JEM Tools," Status: Input Document to JVET, Purpose: Proposal, Joint Video Exploration Team (JVET) of ITU-T SG 16 WP 3 and ISO/IEC JTC 1/SC 29/WG 11, Document: JVET-C0024, 3rd Meeting: Geneva, CH, May 26-Jun. 1, 2016, 5 pages.

Seregin, V. et al., "Variable Number of Intra Modes," Status: Input Document to JVET, Purpose: Proposal, Joint Video Exploration Team (JVET) of ITU-T SG 16 WP 3 and ISO/IEC JTC 1/SC 29/WG 11, Document: JVET-D0113r2, 4th Meeting: Chengdu, CN, Oct. 15-21, 2016, 2 pages.

"Series H: Audiovisual and Multimedia Systems, Infrastructure of audiovisual services Coding of moving video," High efficiency video coding, ITU-T H.265, Telecommunication Standardization Sector of ITU, Feb. 2018, 692 pages.

"Series H: Audiovisual and Multimedia Systems, Infrastructure of audiovisual services Coding of moving video," Advanced video coding for generic audiovisual services, ITU-T H.264, ITU-T Telecommunication Stadardization Sector of ITU, Apr. 2017, 812 pages.

Sullivan, G.J. et al., "Overview of the Hight Efficiency Video Coding (HEVC) Standard," IEEE Transactions on Circuits and Systems for Video Technology, vol. 22, No. 12, Dec. 2012, 20 pages.

* cited by examiner (a) (b)

INTRA-PREDICTION APPARATUS, ENCODING APPARATUS, DECODING APPARATUS AND METHODS FOR NON-SQUARE VIDEO CODING BLOCKS

CROSS-REFERENCE TO RELATED APPLICATIONS

This application is a continuation of International Application No. PCT/RU2018/000431, filed on Jun. 29, 2018, the disclosure of which is hereby incorporated by reference in its entirety.

TECHNICAL FIELD

The present invention generally relates to the field of video coding. More specifically, the invention relates to an apparatus for directional intra-prediction of a video coding block as well as an encoding apparatus and a decoding apparatus comprising such an intra-prediction apparatus. The invention also relates to methods corresponding to the apparatuses.

BACKGROUND

Digital video communication and storage applications are implemented by a wide range of digital devices, e.g. digital cameras, cellular radio telephones, laptops, broadcasting systems, video teleconferencing systems, etc. One of the most important and challenging tasks of these applications is video compression. The task of video compression is complex and is constrained by two contradicting parameters: compression efficiency and computational complexity. Video coding standards, such as ITU-T H.264/AVC or ITU-T H.265/HEVC, provide a good tradeoff between these parameters. For that reason support of video coding standards is a mandatory requirement for almost any video compression application.

Known video coding standards are based on partitioning of a source picture into video coding blocks (or short blocks). Processing of these blocks depend on their size, spatial position and a coding mode specified by an encoder. Coding modes can be classified into two groups according to the type of prediction: intra- and inter-prediction modes. Intra-prediction modes use pixels of the same picture (also referred to as frame or image) to generate reference samples to calculate the prediction values for the pixels of the block being reconstructed. Intra-prediction is also referred to as spatial prediction. Inter-prediction modes are designed for temporal prediction and uses reference samples of previous or next pictures to predict pixels of the block of the current picture.

After a prediction stage, transform coding is performed for a prediction error that is the difference between an original signal and its prediction. Then, the transform coefficients and side information are encoded using an entropy coder (e.g., Context-adaptive binary arithmetic coding (CABAC) for AVC/H.264 and HEVC/H.265). The recently adopted ITU-T H.265/HEVC standard (ISO/IEC 23008-2: 2013, "Information technology—High efficiency coding and media delivery in heterogeneous environments—Part 2: High efficiency video coding", November 2013) declares a set of state-of-the-art video coding tools that provide a reasonable tradeoff between coding efficiency and computational complexity. An overview on the ITU-T H.265/ HEVC standard has been given by Gary J. Sullivan, "Overview of the High Efficiency Video Coding (HEVC) Standard", in IEEE Transactions on Circuits and Systems for Video Technology, Vol. 22, No. 12, December 2012, the entire content of which is incorporated herein by reference.

Similarly to the ITU-T H.264/AVC video coding standard, the HEVC/H.265 video coding standard provides for a division of the source picture into blocks, e.g., coding units (CUs). Each of the CUs can be further split into either smaller CUs or prediction units (PUs). A PU can be intra- or inter-predicted according to the type of processing applied for the pixels of PU. In case of inter-prediction, a PU represents an area of pixels that is processed by motion compensation using a motion vector specified for a PU. For intra prediction, the adjacent pixels of neighbor blocks are used as reference samples to predict a current block. A PU specifies a prediction mode that is selected from the set of intra-prediction modes for all the transform units (TUs) contained in this PU. A TU can have different sizes (e.g., 4×4, 8×8, 16×16 and 32×32 pixels) and can be processed in different ways.

For a TU, transform coding is performed, i.e. the prediction error is transformed with a discrete cosine transform or a discrete sine transform (in the HEVC/H.265 standard, it is applied to intra-coded blocks) and quantized. Hence, reconstructed pixels contain quantization noise (it can become apparent, for examples, as blockiness between units, ringing artifacts along with sharp edges, etc.) that in-loop filters such as Deblocking Filter (DBF), Sample Adaptive Offset (SAO) and Adaptive Loop Filter (ALF) try to suppress. The use of sophisticated prediction coding (such as motion compensation and intra-prediction) and partitioning techniques (e.g., quadtree (QT) for CUs and PUs as well as residual quadtree (RQT) for TUs in the HEVC/H.265 standard and quadtree plus binary tree (QTBT) for the JEM reference software starting from version JEM-3.0) allowed the standardization committee to significantly reduce the redundancy in PUs.

FIG. 1 shows a schematic diagram of a video coding block illustrating different directional intra-prediction modes.

According to the HEVC/H.265 standard or HEVC Reference Model (HM), 35 intra-prediction modes are available. These intra-prediction modes include a planar mode (the intra-prediction mode index is 0), a DC mode (the intra-prediction mode index is 1), and 33 directional modes (the intra-prediction mode index ranges from 2 to 34, indicated by the solid lines).

The set of directional intra-prediction modes of HM has been extended up to 65 modes (almost doubled) for JEM. This extension is carried out by decreasing a step angle between directional intra-prediction modes by a factor of 2. The dotted lines in FIG. 1 denote the angular modes, which are introduced in the JEM software.

For the JEM-3.0 software, a new partitioning mechanism based on both quad-tree and binary-tree (known as QTBT) was proposed. The fundamental difference between the QT and QTBT partitioning mechanisms is that the latter one enables not only square but also rectangular blocks by using partitioning based on both quad- and binary-tree.

FIG. 2 shows an example of block partitioning and a corresponding tree structure by using quad-tree plus binary-tree (QTBT). Solid lines denote quad-tree partitioning and dashed lines denote binary-tree partitioning. In each partitioning node of the binary-tree, the partitioning type is indicated by 0 (horizontal partitioning) or 1 (vertical partitioning).

Some signaling overhead and increased computational complexity at the encoder side are the price of the QTBT partitioning as compared to conventional quad-tree based partitioning used in the HEVC/H.265 standard. Nevertheless, the QTBT-based partitioning is endowed with better segmentation properties and demonstrates significantly higher coding efficiency than the conventional quad-tree ("EE2.1: Quadtree plus binary tree structure integration with JEM tools," Contribution JVET-C0024 to the 3rd JVET meeting, Geneva, Switzerland, May 2016 by Han Huang, Kai Zhang, Yu-Wen Huang, Shawmin Lei).

FIG. 3 shows example of blocks or video coding blocks generated by the known QTBT framework. A rectangular block generated by the QTBT framework can be a vertically oriented block 300 (vertical orientation of a block) or a horizontally oriented block 301 (horizontal orientation of a block).

FIGS. 4a and 4b show known directional intra-prediction mechanisms in the QT and QTBT frameworks. Particularly, FIG. 4a shows a known intra-prediction mechanism for QT using the same number of reference samples the both sides of the square block.

FIG. 4b shows a known intra-prediction mechanism in the QTBT framework. It can be seen that for QTBT, the same number of reference samples are used along both shorter and longer sides of rectangular blocks. The set of available directional intra-prediction modes has not been changed with respect to QT. Accordingly, the asymmetry nature of rectangular blocks utilized by the QTBT framework has not been taken into account.

SUMMARY

Having recognized the above-mentioned disadvantages and problems, the invention aims to improve the state of the art. In particular, an object of the invention is to provide an improved directional intra-prediction. Particularly, it is proposed to improve the directional intra-prediction with respect to the determination of the directional intra-prediction modes.

The above-mentioned object is achieved by the features of the independent claims. Further embodiments of the invention are apparent from the dependent claims, the description and the figures.

According to a first aspect, the invention relates to an intra-prediction apparatus for intra-predicting a rectangular and non-square video coding block. The intra-predicting is based on a set of directional intra-prediction modes distributed over a set of directional ranges. The intra-prediction apparatus is configured to select a directional range from the set of directional ranges. The intra-prediction apparatus is configured to determine a number of directional intra-prediction modes of the selected directional range depending on the size of the block.

Thereby, the coding efficiency of the directional intra-prediction can be improved. Particularly, the coding efficiency can be adapted to the size of the block.

The video coding block can represent an M×N (M-column by N-row) array of pixels or more generally samples. The size of the block can be the block size expressed in pixels or more generally in samples. A pixel can comprise the intensity of several color components, for example the intensity of three or four color components. The color components depend on the used color model, and can for example comprise red, green, or blue in the RGB color model. A sample can comprise the value of a single color component. The size of the block is preferably the absolute size of the block and corresponds to the width and length of the block.

According to a further implementation of the first aspect, the intra-prediction apparatus is configured to determine the number of directional intra-prediction modes of the selected directional range depending on the size of the block and an aspect ratio of the block.

Thereby, the coding efficiency of the directional intra-prediction can be improved. Particularly, the coding efficiency can be adapted to the size of the block and to the aspect ratio of the block.

The aspect ratio of the block can be determined on the basis of a long side of the block to a short side of the block, or alternatively on the basis of a width of the block to a height of the block. The aspect ratio of the block can be the ratio of the long side of the block to the short side of the block, or inversely. Alternatively, the aspect ratio of the block can be the ratio of the width of the block to the height of the block, or inversely. Since the video coding block can represent an M×N (M-column by N-row) array of pixels or samples, the aspect ratio can be M/N or N/M.

According to a further implementation of the first aspect, the intra-prediction apparatus is configured to select, from the set of directional ranges, a short directional range associated with a short side of the block and a long directional range associated with a long side of the block. The intra-prediction apparatus is configured to determine the number $\Delta M_{short}$ of directional intra-prediction modes of the short directional range and the number $\Delta M_{long}$ of directional intra-prediction modes of the long directional range according to the equation:

$$\Delta M_{long}/L_{long} < \Delta M_{short}/L_{short}$$

wherein $L_{short}$ is the length of the short side of the block, and
$L_{long}$ is the length of the long side of the block.

Thereby, the number of directional intra-prediction modes of the long directional range can be determined for having a higher accuracy of the directional prediction, and the number of directional intra-prediction modes of the short directional range can be determined for having a lower accuracy. This improves the coding efficiency of the directional intra-prediction. The short directional range can be associated with the whole length $L_{short}$ of the short side, and the long directional range can be associated with the whole length $L_{long}$ of the long side.

According to a further implementation of the first aspect, the intra-prediction apparatus is configured to select, from the set of directional ranges, a short directional range associated with a short side of the block, and a long directional range associated with a long side of the block. The intra-prediction apparatus is configured to determine the number $\Delta M_{short}$ of directional intra-prediction modes of the short directional range and the number $\Delta M_{long}$ of directional intra-prediction modes of the long directional range such that the angular resolution $AR_{short}$ of the short directional range is higher than the angular resolution $AR_{long}$ of the long directional range. The angular resolution $AR_G$ of a given directional range is proportional to the number $\Delta M_G$ of directional intra-prediction modes of the given directional range, and is inversely proportional to the angle $\alpha_G$ of the given directional range.

Thereby, the adaptation of the angular resolution has the advantage that a higher accuracy of the directional prediction can be obtained for the long directional range, and a lower accuracy of the direction prediction can be obtained for the short directional range. This improves the coding efficiency of the directional intra-prediction.

According to a further implementation of the first aspect, the angular resolution $AR_G$ of the given directional range is defined by the following equation:

$$AR_G = \Delta M_G / \alpha_G.$$

Thereby, it can be ensured that the accuracy of the directional prediction is optimized for the long directional range and the short directional range. This improves the coding efficiency of the directional intra-prediction.

According to a further implementation of the first aspect, two neighboring directional intra-prediction modes of the short directional range are separated by a fixed angle β. Additionally or alternatively, two neighboring directional intra-prediction modes of the long directional range are separated by a fixed angle α.

Thereby, the improved coding efficiency can be easily implemented.

According to a further implementation of the first aspect, the set of directional ranges comprises a basis directional range associated with a long side of the block. The set of directional ranges comprises an extension directional range that is associated with the long side of the block and that is dependent on an aspect ratio of the block. The basis directional range and the extension directional range are disjoint. The intra-prediction apparatus is configured to select the extension directional range. The intra-prediction apparatus is configured to determine the number $\Delta M_0$ of directional intra-prediction modes of the extension directional range depending on the difference between the length $L_{long}$ of the long side of the block and the length $L_{short}$ of the short side of the block.

Thereby, the coding efficiency for the extension directional range can be improved. The basis directional range can be associated with a first length of the long side of the block, said first length corresponding to the length $L_{short}$ of the short side. The extension directional range can be associated with a second length of the long side of the block, said second length corresponding to the difference between $L_{long}$ and $L_{short}$.

According to a further implementation of the first aspect, the set of directional ranges comprises a basis directional range associated with a long side of the block. The set of directional ranges comprises an extension directional range that is associated with the long side of the block and that is dependent on an aspect ratio of the block. The basis directional range and the extension directional range are disjoint. The intra-prediction apparatus is configured to select the extension directional range. The intra-prediction apparatus is configured to determine the number $\Delta M_0$ of directional intra-prediction modes of the extension directional range so that, if the aspect ratio of the block remains constant and the length $L_{short}$ of the short side of the block increases, then the number $\Delta M_0$ is increased.

Thereby, the coding efficiency for the extension directional range can be improved. The basis directional range can be associated with a first length of the long side of the block, said first length corresponding to the length $L_{short}$ of the short side. The extension directional range can be associated with a second length of the long side of the block, said second length corresponding to the difference between $L_{long}$ and $L_{short}$.

According to a further implementation of the first aspect, the intra-prediction apparatus is configured to determine the number of directional intra-prediction modes of the selected directional range based on a look-up table. The look-up table defines the number of directional intra-prediction modes of the selected directional range for different sizes of the block.

Thereby, a simple way to determine the number of directional intra-prediction modes and to improve the coding efficiency is provided.

According to a second aspect, the invention relates to an encoding apparatus for encoding a rectangular and non-square video coding block. The encoding apparatus comprises an intra-prediction apparatus according to the first aspect for providing a predicted video coding block. The encoding apparatus is configured to encode the video coding block into an encoded video bitstream on the basis of the predicted video coding block.

Thereby, the encoding apparatus can be optimized and the encoding-side complexity can be reduced since e.g. redundant directional modes can be avoided along the short side of a block.

According to a third aspect, the invention relates to a decoding apparatus for decoding an encoded video bitstream. The decoding apparatus comprises an intra-prediction apparatus according to the first aspect for providing a predicted video coding block. The decoding apparatus is configured to restore a rectangular and non-square video coding block from the encoded video bitstream on the basis of the predicted video coding block.

Thereby, the decoding apparatus can be optimized and adapted to the improved coding efficiency.

According to a fourth aspect, the invention relates to an intra-prediction method for intra-predicting a rectangular and non-square video coding block based on a set of directional intra-prediction modes distributed over a set of directional ranges. The intra-prediction method comprises selecting a directional range from the set of directional ranges. The intra-prediction method comprises determining a number of directional intra-prediction modes of the selected directional range depending on the size of the block.

Thereby, the coding efficiency of the directional intra-prediction can be improved. Particularly, the coding efficiency can be adapted to the size of the block.

According to a further implementation of the fourth aspect, the intra-prediction method comprises determining the number of directional intra-prediction modes of the selected directional range depending on the size of the block and an aspect ratio of the block.

Thereby, the coding efficiency of the directional intra-prediction can be improved. Particularly, the coding efficiency can be adapted to the size of the block and to the aspect ratio of the block.

According to a further implementation of the fourth aspect, the intra-prediction method comprises selecting, from the set of directional ranges, a short directional range associated with a short side of the block and a long directional range associated with a long side of the block. The intra-prediction method comprises determining the number $\Delta M_{short}$ of directional intra-prediction modes of the short directional range and the number $\Delta M_{long}$ of directional intra-prediction modes of the long directional range according to the equation:

$$\Delta M_{long}/L_{long} < \Delta M_{short}/L_{short}$$

wherein $L_{short}$ is the length of the short side of the block, and
$L_{long}$ is the length of the long side of the block.

Thereby, the number of directional intra-prediction modes of the long directional range can be determined for having a higher accuracy of the directional prediction, and the number of directional intra-prediction modes of the short directional range can be determined for having a lower accuracy. This improves the coding efficiency of the directional intra-prediction. The short directional range can be associated with the whole length $L_{short}$ of the short side, and the long directional range can be associated with the whole length $L_{long}$ of the long side.

According to a further implementation of the fourth aspect, the intra-prediction method comprises selecting, from the set of directional ranges, a short directional range associated with a short side of the block, and a long directional range associated with a long side of the block. The intra-prediction method comprises determining the number $\Delta M_{short}$ of directional intra-prediction modes of the short directional range and the number $\Delta M_{long}$ of directional intra-prediction modes of the long directional range such that the angular resolution $AR_{short}$ of the short directional range is higher than the angular resolution $AR_{long}$ of the long directional range. The angular resolution $AR_G$ of a given directional range is proportional to the number $\Delta M_G$ of directional intra-prediction modes of the given directional range, and is inversely proportional to the angle $\alpha_G$ of the given directional range.

Thereby, the adaptation of the angular resolution has the advantage that a higher accuracy of the directional prediction can be obtained for the long directional range, and a lower accuracy of the direction prediction can be obtained for the short directional range. This improves the coding efficiency of the directional intra-prediction.

According to a further implementation of the fourth aspect, the angular resolution $AR_G$ of the given directional range is defined by the following equation:

$$AR_G = \Delta M_G / \alpha_G.$$

Thereby, it can be ensured that the accuracy of the directional prediction is optimized for the long directional range and the short directional range. This improves the coding efficiency of the directional intra-prediction.

According to a further implementation of the fourth aspect, two neighboring directional intra-prediction modes of the short directional range are separated by a fixed angle $\beta$. Additionally or alternatively, two neighboring directional intra-prediction modes of the long directional range are separated by a fixed angle $\alpha$.

Thereby, the improved coding efficiency can be easily implemented.

According to a further implementation of the fourth aspect, the set of directional ranges comprises a basis directional range associated with a long side of the block. The set of directional ranges comprises an extension directional range that is associated with the long side of the block and that is dependent on an aspect ratio of the block. The basis directional range and the extension directional range are disjoint. The intra-prediction method comprises selecting the extension directional range. The intra-prediction method comprises determining the number $\Delta M_0$ of directional intra-prediction modes of the extension directional range depending on the difference between the length $L_{long}$ of the long side of the block and the length $L_{short}$ of the short side of the block.

Thereby, the coding efficiency for the extension directional range can be improved. The basis directional range can be associated with a first length of the long side of the block, said first length corresponding to the length $L_{short}$ of the short side. The extension directional range can be associated with a second length of the long side of the block, said second length corresponding to the difference between $L_{long}$ and $L_{short}$.

According to a further implementation of the fourth aspect, the set of directional ranges comprises a basis directional range associated with a long side of the block. The set of directional ranges comprises an extension directional range that is associated with the long side of the block and that is dependent on an aspect ratio of the block. The basis directional range and the extension directional range are disjoint. The intra-prediction method comprises selecting the extension directional range. The intra-prediction method comprises determining the number $\Delta M_0$ of directional intra-prediction modes of the extension directional range so that, if the aspect ratio of the block remains constant and the length $L_{short}$ of the short side of the block increases, then the number $\Delta M_0$ is increased.

Thereby, the coding efficiency for the extension directional range can be improved. The basis directional range can be associated with a first length of the long side of the block, said first length corresponding to the length $L_{short}$ of the short side. The extension directional range can be associated with a second length of the long side of the block, said second length corresponding to the difference between $L_{long}$ and $L_{short}$.

According to a further implementation of the fourth aspect, the intra-prediction method comprises determining the number of directional intra-prediction modes of the selected directional range based on a look-up table. The look-up table defines the number of directional intra-prediction modes of the selected directional range for different sizes of the block.

Thereby, a simple way to determine the number of directional intra-prediction modes and to improve the coding efficiency is provided.

According to a fifth aspect, the invention relates to an encoding method for encoding a rectangular and non-square video coding block. The encoding method comprises the intra-prediction method according to the fourth aspect for providing a predicted video coding block. The encoding method comprises encoding the video coding block into an encoded video bitstream on the basis of the predicted video coding block.

Thereby, the encoding method can be optimized and the encoding-side complexity can be reduced since e.g. redundant directional modes can be avoided along the short side of a block.

According to a sixth aspect, the invention relates to a decoding method for decoding an encoded video bitstream. The decoding method comprises the intra-prediction method according to the fourth aspect for providing a predicted video coding block. The decoding method comprises restoring a rectangular and non-square video coding block from the encoded video bitstream on the basis of the predicted video coding block.

Thereby, the decoding method can be optimized and adapted to the improved coding efficiency.

According to a seventh aspect, the invention relates to a computer program comprising a program code for performing the method according to the fourth, fifth, or sixth aspect, when the computer program runs on a computing device.

Thereby, the method can be performed in an automatic and repeatable manner. Advantageously, the computer program can be respectively performed by the intra-prediction apparatus according to the first aspect, by the encoding apparatus according to the second aspect, or by the decoding apparatus according to the third aspect.

The invention is aimed at improving the directional intra-prediction mechanism used e.g. within the QTBT framework by using such a set of directional intra-prediction modes and determined the cardinality of the set depending on the actual lengths of each block side, and optionally on the aspect ratio of the block, reducing the signaling overhead caused by applying a redundant subset of directional intra-prediction mode to a short side of the block, increasing the coding efficiency of directional intra-prediction due to higher prediction accuracy along with a long side of the block, or reducing the encoder-side complexity due to excluding redundant directional modes along with a short side of the block.

In order to signal directional modes, not only the lengths of the block sides but also the aspect ratio of the block can be used to select what directional modes should be used or skipped.

The invention and its multimedia coding embodiments provides the following advantages, including additional coding gain can be reached due to this technique, it can be used in many potential applications in hybrid video coding paradigms that are compatible with the HM software and the VPX video codec family as well as the JEM and VTM software and the VPX/AV1 video codec family that are a state-of-the-art and a next-generation video coding frameworks, respectively, hardware and computational complexities are kept low at both encoder and decoder sides, and the invention can be easily implemented in such codecs that use conventional directional intra-prediction mechanisms.

More specifically, it should be noted that the above apparatuses may be implemented based on a discrete hardware circuitry with discrete hardware components, integrated chips or arrangements of chip modules, or based on a signal processing device or chip controlled by a software routine or program stored in a memory, written on a computer-readable medium or downloaded from a network such as the internet.

It shall further be understood that a preferred embodiment of the invention can also be any combination of the dependent claims or above embodiments with the respective independent claim.

These and other aspects of the invention will be apparent and elucidated with reference to the embodiments described hereinafter.

BRIEF DESCRIPTION OF THE DRAWINGS

The above aspects and implementation forms of the invention will be explained in the following description of specific embodiments in relation to the enclosed drawings, in which.

DETAILED DESCRIPTION OF ILLUSTRATIVE EMBODIMENTS

Figure 13:
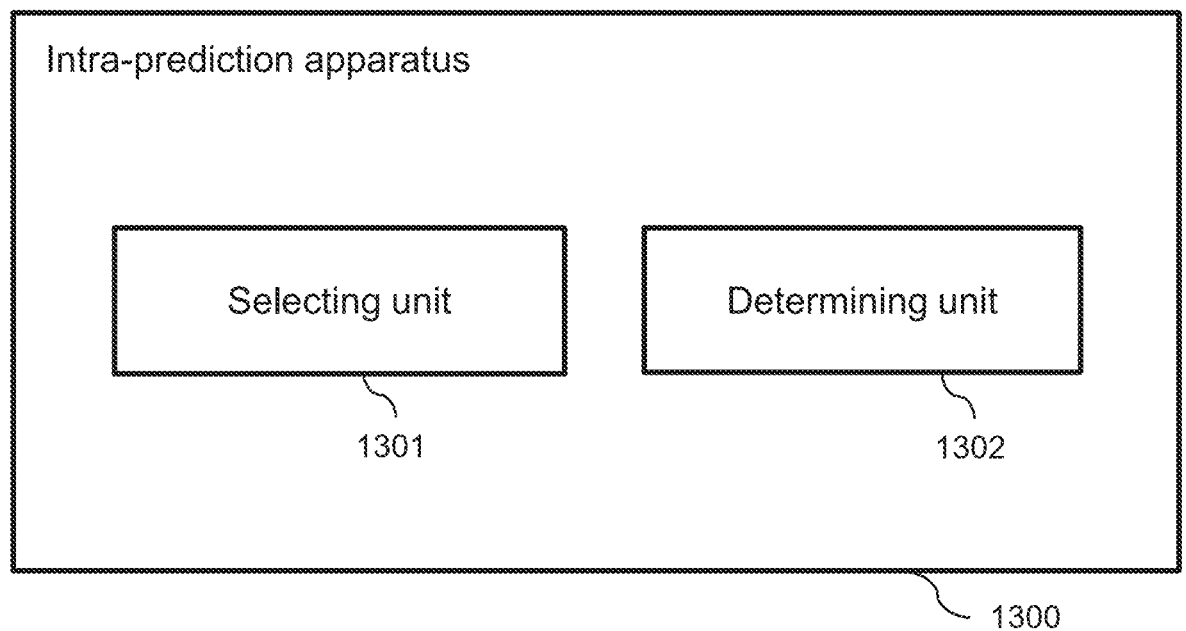
FIG. 13 shows an intra-prediction apparatus according to an embodiment of the invention.

FIG. 13 shows an intra-prediction apparatus 1300 according to an embodiment of the invention.

It is shown an intra-prediction apparatus 1300 for intra-predicting a rectangular and non-square video coding block based on a set of directional intra-prediction modes distributed over a set of directional ranges. The intra-prediction apparatus 1300 is configured to select 1301 a directional range from the set of directional ranges, and to determine 1302 a number of directional intra-prediction modes of the selected directional range depending on the size of the block.

Figure 14:
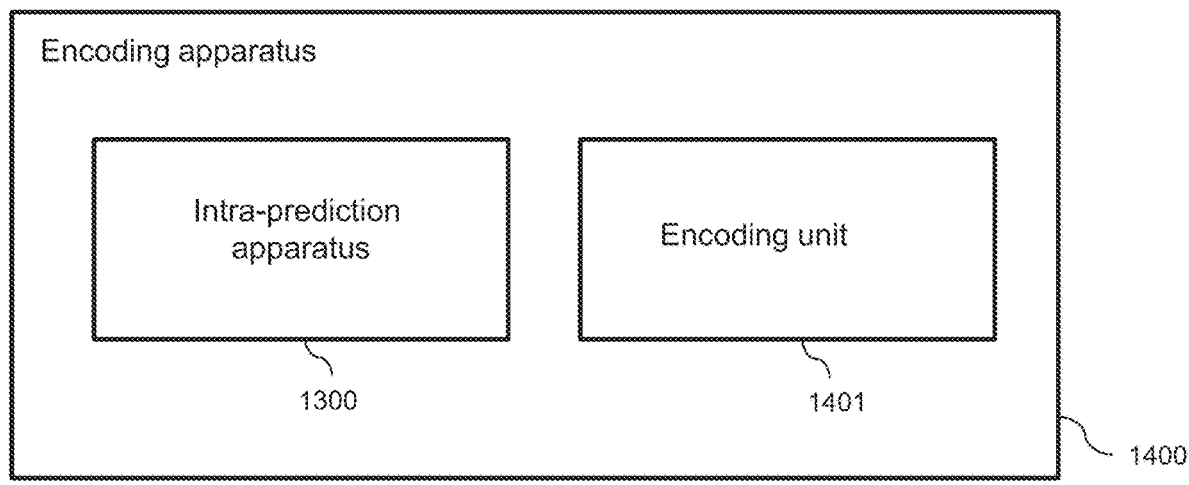
FIG. 14 shows an encoding apparatus according to an embodiment of the invention.

FIG. 14 shows an encoding apparatus 1400 according to an embodiment of the invention.

It is shown an encoding apparatus 1400 for encoding a rectangular and non-square video coding block. The encoding apparatus 1400 comprises the intra-prediction apparatus 1300 for providing a predicted video coding block. The encoding apparatus 1400 is configured to encode 1401 the video coding block into an encoded video bitstream on the basis of the predicted video coding block.

Figure 15:
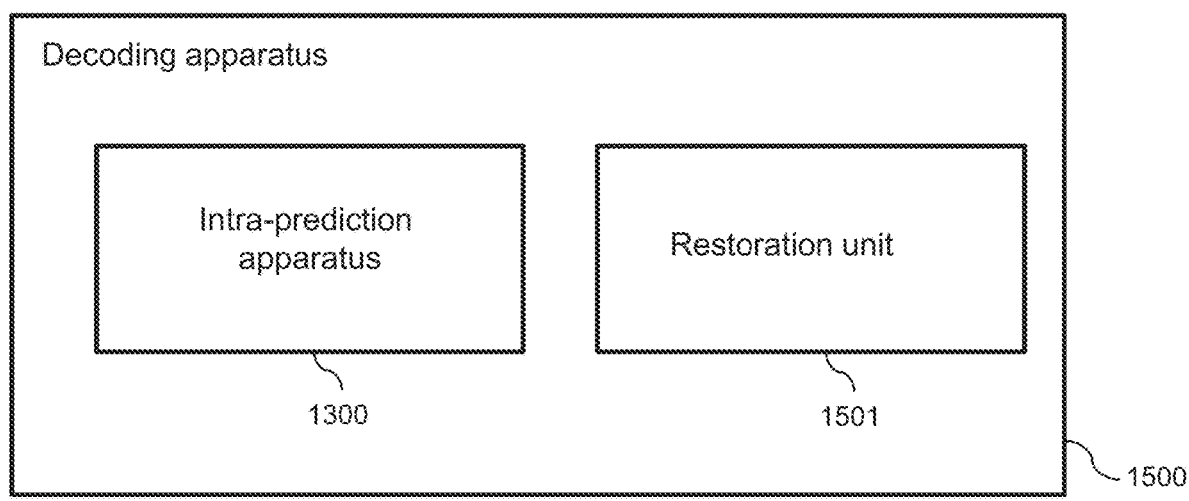
FIG. 15 shows a decoding apparatus according to an embodiment of the invention.

FIG. 15 shows a decoding apparatus 1500 according to an embodiment of the invention.

It is shown a decoding apparatus 1500 for decoding an encoded video bitstream. The decoding apparatus 1500 comprises the intra-prediction apparatus 1300 for providing a predicted video coding block. The decoding apparatus 1500 is configured to restore 1501 a rectangular and non-square video coding block from the encoded video bitstream on the basis of the predicted video coding block.

Figure 16:
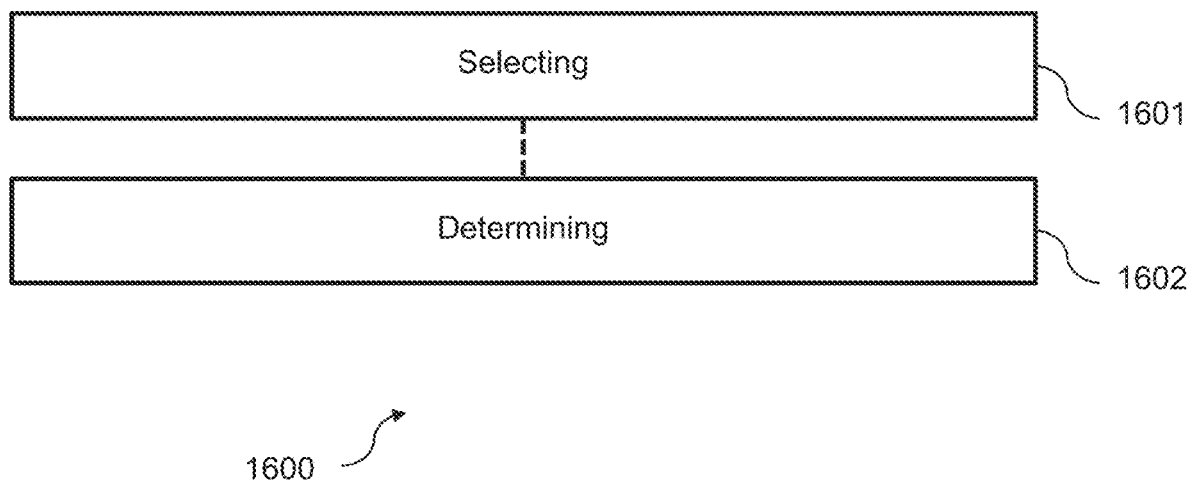
FIG. 16 shows an intra-prediction method according to an embodiment of the invention.

FIG. 16 shows an intra-prediction method 1600 according to an embodiment of the invention.

It is shown an intra-prediction method 1600 for intra-predicting a rectangular and non-square video coding block based on a set of directional intra-prediction modes distributed over a set of directional ranges. The intra-prediction method comprises selecting 1601 a directional range from the set of directional ranges. The intra-prediction method comprises determining a number of directional intra-prediction modes of the selected directional range depending on the size of the block.

Figure 17:
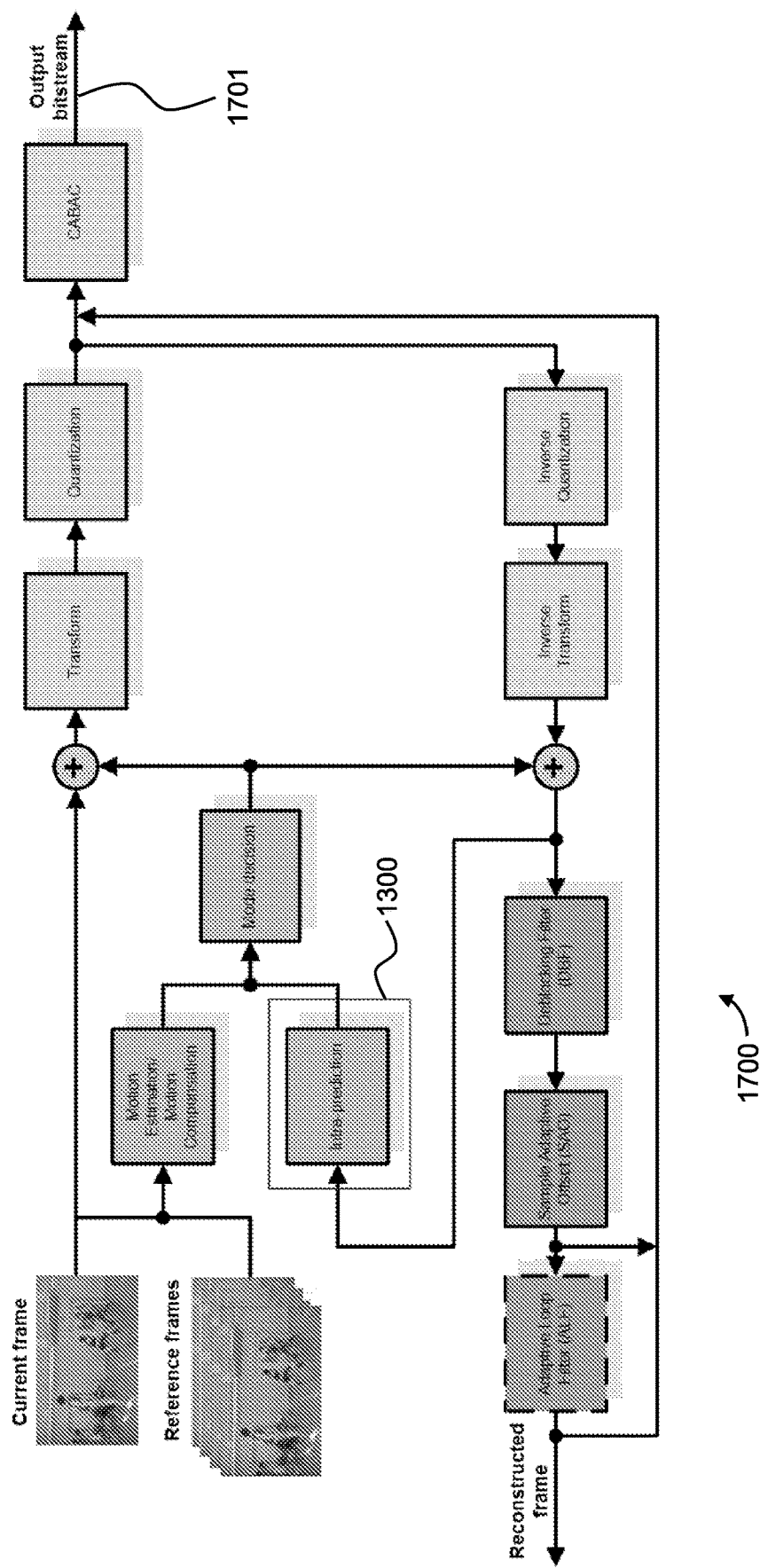
FIG. 17 shows an encoding apparatus according to an embodiment of the invention.

FIG. 17 shows a schematic diagram of an encoding apparatus 1700 for encoding a rectangular video coding block comprising the intra-prediction apparatus 1300. The encoded video bitstream is identified in FIG. 17 as output bitstream 1701. A decoding apparatus can be implemented analogously.

Figure 9:
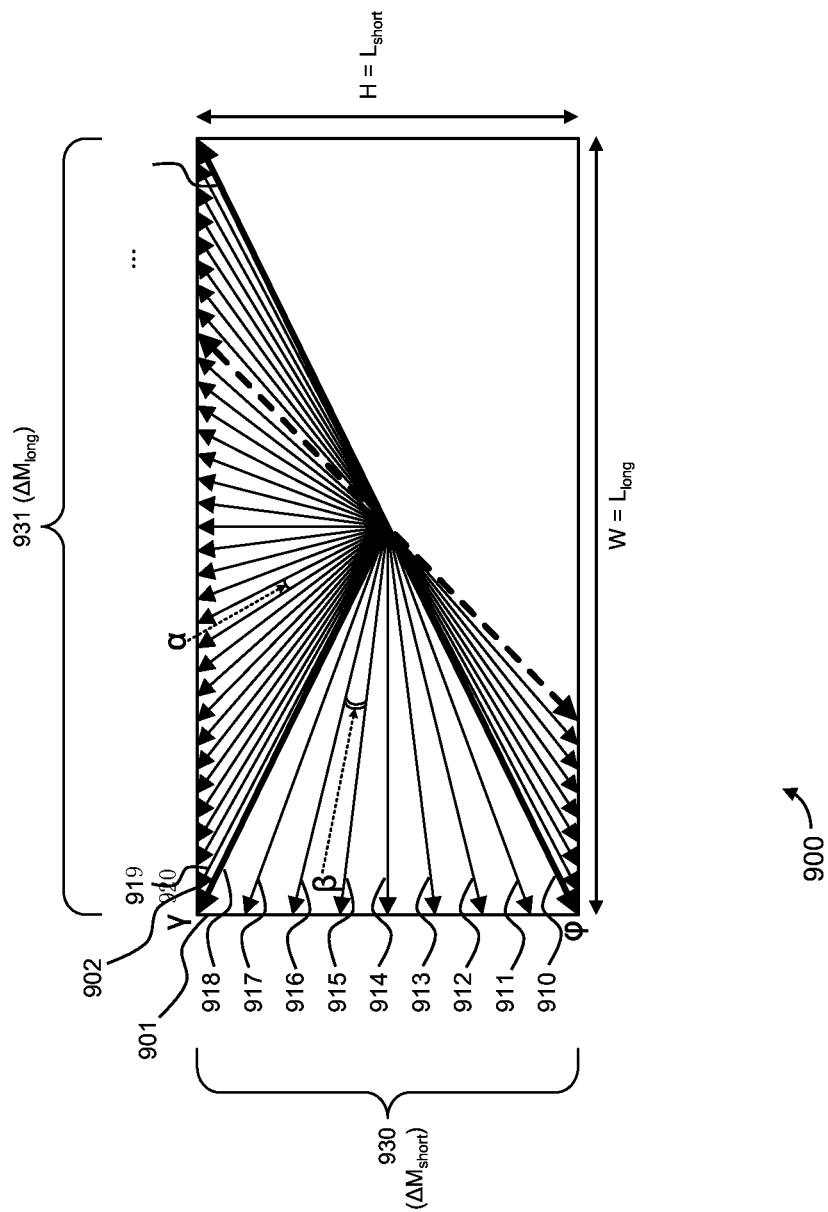
FIG. 9 shows the determination of a number of directional intra-prediction modes according to an embodiment of the invention.

FIG. 9 shows the determination of a number of directional intra-prediction modes according to an embodiment of the invention.

A rectangular and non-square video coding block 900 is shown. The block 900 has a short side 901 and a long side 902. The intra-prediction of the block 900 is based on a set of directional intra-prediction modes. The set of directional intra-prediction modes comprises diagonal modes 910-920. The diagonal modes are distributed over a set of directional ranges.

The set of directional ranges comprises a short directional range 930 associated with the short side 901 of the block 900 and a long directional range 931 associated with the long side 902 of the block 900. The short directional range 930 can be associated with the entire short side 901 and the long directional range 931 can be associated with the entire long side 902.

The set of directional intra-prediction modes comprises two diagonal modes 910, 918 delimiting the short directional range 930. These two diagonal modes 910, 918 present an angle of $\phi$, respectively $\gamma$. The set of directional intra-prediction modes also comprises a diagonal mode 920 that delimits, together with the diagonal mode 918, the long directional range 931.

The short directional range 930 comprises the two diagonal modes 910, 918 and further diagonal modes 911, 912, 913, 914, 915, 916, 917 between said diagonal modes 910, 918. The number of directional intra-prediction modes 910-918 of the short directional range 930 is $\Delta M_{short}$.

Similarly, the long directional range 931 comprises the two delimiting diagonal modes 918, 920 and further diagonal modes 919 located between the two delimiting diagonal modes 918, 920. The number of directional intra-prediction modes 918-920 of the long directional range 931 is $\Delta M_{long}$.

The number $\Delta M_{short}$ and/or the number $\Delta M_{long}$ can be determined depending on the size of the block 900, e.g. depending on the length $L_{short}$ of the short side 901 of the block 900 and depending on the length $L_{long}$ of the long side 902 of the block 900.

The numbers $\Delta M_{short}$ and $\Delta M_{long}$ of directional intra-prediction modes of respectively the short directional range 930 and the long directional range 931 can be determined according to the equation:

$$\Delta M_{long}/L_{long} < \Delta M_{short}/L_{short}$$

It is proposed to keep different number of directional intra-prediction for each side of the rectangular block 900. The actual number of these modes can be defined by the length of each side of the block 900. More particularly, the number of these modes can be defined by the following characteristics of the block goo: the aspect ratio and length of each side.

As shown in FIG. 9, the angular resolution $\beta$ of the short directional range 930 can be higher than the angular resolution $\alpha$ of the long directional range 931. This is advantageous because if the angular resolution $\beta$ would be identical to the angular resolution $\alpha$, then different directional intra-predictions would provide the same result within the short directional range 930. In other words, the longer a block side is, the higher accuracy of directional prediction is required and vice versa. Increasing the angular resolution $\beta$ of the short directional range 930 thus improves the coding efficiency.

To switch between different angular resolutions $\beta$, a of directional modes, the angles $\phi$, $\gamma$ of the two diagonal modes 910, 918 delimiting the short directional range 930 can be determined. These angles can be calculated as follows:

$$\gamma = \pi - \arctan\left(\frac{H}{W}\right), \quad (1)$$

$$\varphi = \pi + \arctan\left(\frac{H}{W}\right). \quad (2)$$

wherein H is the height of the block 900 that corresponds to the length $L_{short}$ of the short side 901 of the block 900, and W is the width of the block 900 that corresponds to the length $L_{long}$ of the long side 902.

These two equations correspond to the horizontal orientation of the block 900, and can be adapted to the vertical block orientation.

Figure 10:
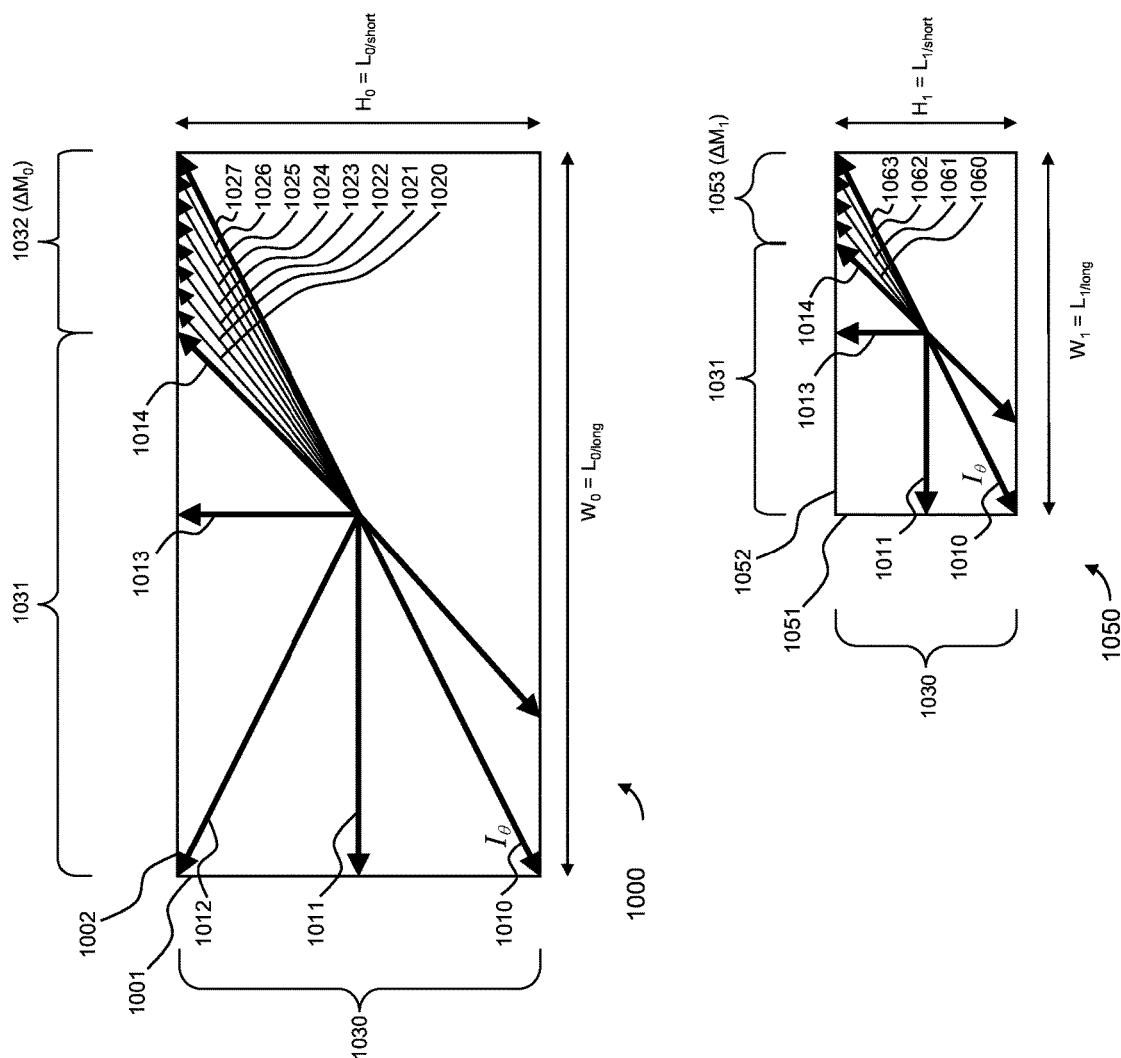
FIG. 10 shows the determination of a number of directional intra-prediction modes according to an embodiment of the invention.

FIG. 10 shows the determination of a number of directional intra-prediction modes according to an embodiment of the invention.

A rectangular and non-square video coding block 1000 is shown. The block 1000 has a short side 1001 and a long side 1002. The intra-prediction of the block 1000 is based on a set of directional intra-prediction modes. The set of directional intra-prediction modes comprises diagonal modes 1010-1027. The diagonal modes are distributed over a set of directional ranges.

The set of directional ranges comprises a short directional range 1030 associated with the short side 1001 of the block 1000. The short directional range 1030 can be associated with the entire short side 1001. The short directional range 1030 comprises two delimiting diagonal modes 1010, 1012 and further diagonal modes 1011 between said delimiting diagonal modes 1010, 1012. The delimiting diagonal mode 1010 has an angle $I_\theta$.

The set of directional ranges comprises a basis directional range 1031 and an extension directional range 1032 that are associated with the long side 1002 of the block 1000. The basis directional range 1031 and the extension directional range 1032 can be separated or disjoint. The basis directional range 1031 and the extension directional range 1032 can share a common delimiting diagonal mode 1014. The basis directional range 1031 comprises diagonal modes 1012, 1013, 1014. The extension directional range 1032 comprises delimiting diagonal modes 1014, 1027 and further diagonal modes 1020, 1021, 1022, 1023, 1024, 1025, 1026, 1027 comprised between said delimiting diagonal modes 1014, 1027.

The number $\Delta M_0$ of directional intra-prediction modes 1020-1027 of the extension directional range 1032 depends on the difference between the length $L_{0/long}$ of the long side 1002 of the block 1000 and the length $L_{0/short}$ of the short side 1001 of the block 1000.

Particularly, if the difference $L_{0/long} - L_{0/short}$ increases, then the number $\Delta M_0$ can be increased, and vice versa.

FIG. 10 shows another rectangular and non-square video coding block 1050. The block 1050 has the same aspect ratio as the block 1000. The aspect ratio of the block 1000 can be defined as $R_{A0} = W_0/H_0$, wherein $W_0$ is the width and $H_0$ the height of the block 1000. Similarly, the aspect ratio of the block 1050 can be defined as $R_{A1} = W_1/H_1$, wherein $W_1$ is the width and $H_1$ the height of the block 1050. In the embodiment of FIG. 10, $W_0$ and $W_1$ are the lengths of the long side of the blocks 1000, 1050. The block 1050 has a number $\Delta M_1$ of directional intra-prediction modes 1060, 1061, 1062, 1063 of the extension directional range 1053.

For an identical aspect ratio $R_{A0}=R_{A1}$, it is proposed that if the length $L_{0/long}$ of the long side 1052 of the block 1050 is smaller than the length $L_{0/long}$ of the long side 1002 of the block 1000, then the number $\Delta M_1$ of directional intra-prediction modes 1060-1063 of the extension directional range 1053 of block 1050 shall be smaller than the number $\Delta M_0$ of directional intra-prediction modes of the extension directional range 1032 of block 1000, and vice versa.

In the embodiment illustrated in FIG. 10, the set of the directional modes can be extended by adding new directions subject to the aspect ratio of the block, said new directions building the extension direction range 1032. In this embodiment, the cardinality of the subset of newly added directional modes, i.e. the cardinality of the extension direction range 1032, depends on the actual lengths of the block sides, and optionally also on the aspect ratio of the block.

In the embodiment illustrated in FIG. 10, the same number of reference samples or the same number of directional inter-predication modes can be used along both the short directional range 1030 and the basis directional range 1031. The number of directional intra-prediction modes of the basis directional range 1031 preferably depends neither on the aspect ratio of the block 1000 nor on the size of the block 1000.

The extension directional range 1032 is preferably added if the block 1000 is a non-square block. The angle $\alpha_{ext}$ of the extension directional range 1032 is defined as the angle between its two delimiting directional intra-prediction modes 1014, 1027. The angle of the extension directional range 1032 can be given by the following formula:

$$\alpha_{ext} = \frac{\pi}{4} - \arctan\left(\frac{L_{0/short}}{L_{0/long}}\right)$$

Figure 6:
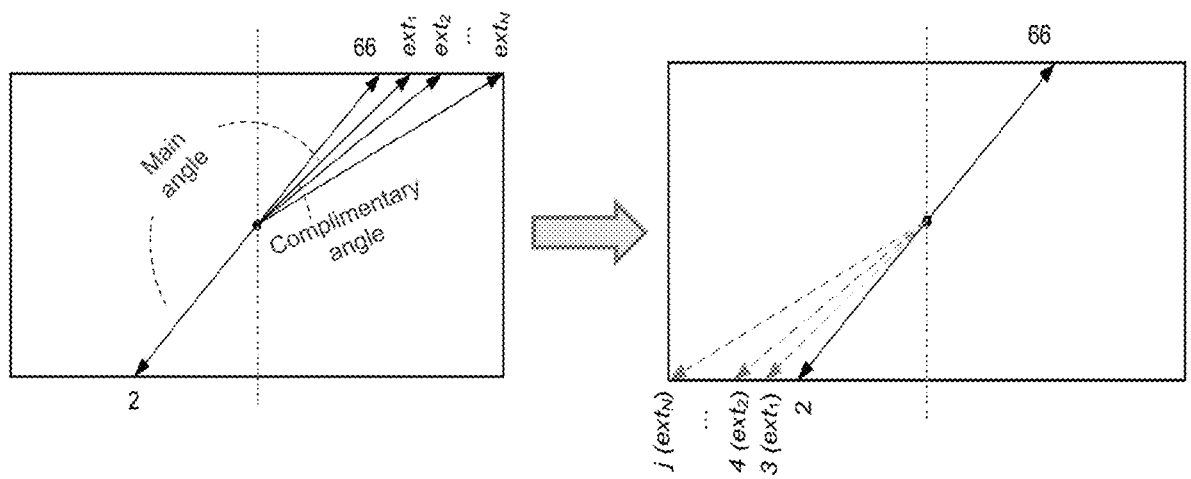
FIG. 6 shows an embodiment of an extension directional range according to FIG. 10.

FIG. 6 shows an embodiment of an extension directional range according to FIG. 10.

The asymmetry of the non-square block is used to improve the directional intra-prediction mechanism by increasing its prediction accuracy. This is achieved by building the extension directional range. The angle $\alpha_{ext}$ of the extension directional range is indicated as complimentary angle in FIG. 6.

The extension directional range can comprise, in addition to the mode 66, additional directional intra-prediction modes $ext_1$, $ext_2$, ... $ext_N$. The number of modes N+1 of the extension directional range depends on the size of the block.

If a set of directional intra-prediction modes is extended, i.e. if the extension directional range is used, it is desirable to signal the newly extended modes, which may not be accomplished using existing conventional mechanisms. For this purpose, a 2-step signaling mechanism for the extension of directional intra-prediction modes is proposed.

FIG. 6 shows a first step of a signaling mechanism for extension of directional intra-prediction modes, wherein a set of modes of the extension directional range is mapped to a conventional set of intra prediction modes using a mirroring procedure.

Figure 7:
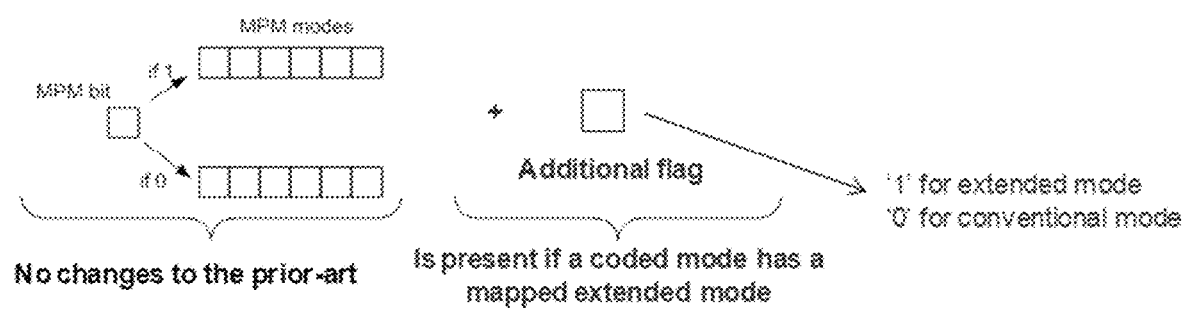
FIG. 7 shows a signaling mechanism for an extension directional range according to FIG. 10.

FIG. 7 shows a second step of a signaling mechanism for extension of directional intra-prediction modes, wherein a one-bit flag is used to distinguish between conventional modes of the basis directional range 1031 and extended directional modes of the extension directional range 1032. The flag is assigned a value "o" for a conventional mode and "1" for an extended mode. Furthermore, the flag in the signaling mechanism is used only for those directional modes that are reflections of extended ones.

Figure 8:
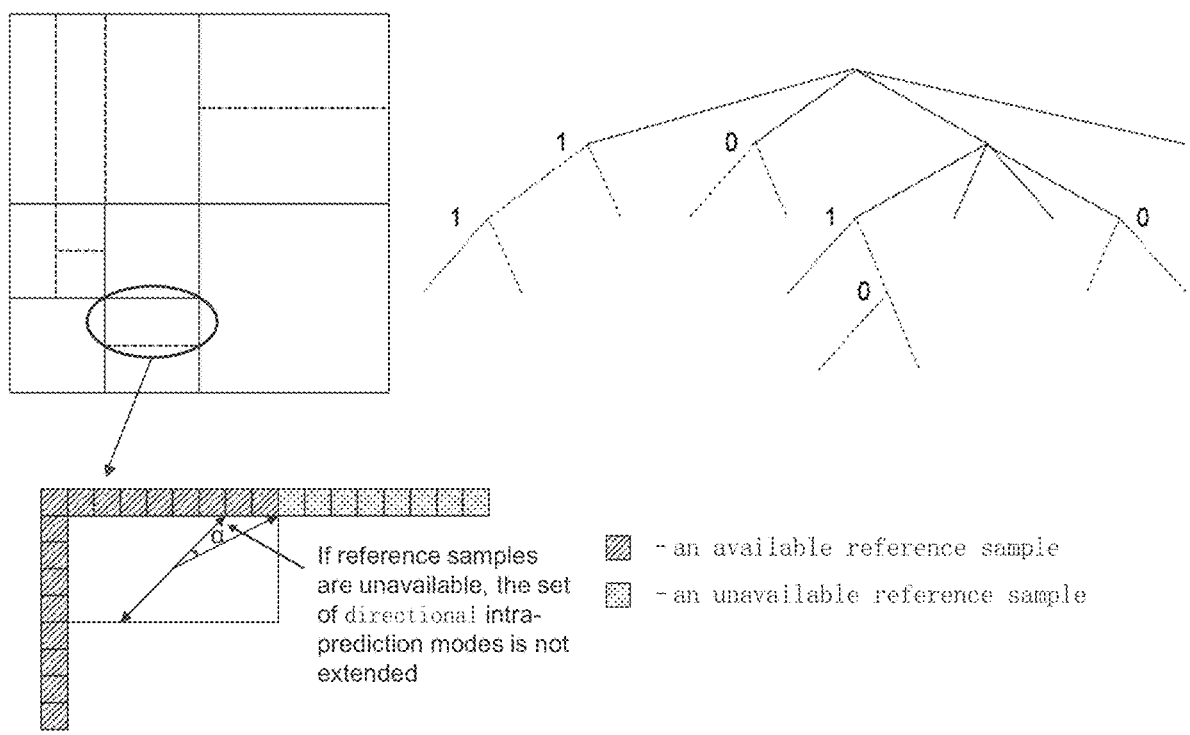
FIG. 8 shows an example of block partitioning according to FIG. 10 and a corresponding tree structure by using quad-tree plus binary-tree (QTBT)

FIG. 8 shows an example of block partitioning according to FIG. 10 and a corresponding tree structure by using quad-tree plus binary-tree (QTBT), wherein the number of available reference samples along a longer side is less than its double length in a rectangular video coding block. As shown in FIG. 8, the quad-tree plus binary-tree (QTBT) partitioning framework produces a partitioning, wherein the actual number of available reference samples along a long side of the block is less than its double length.

Figure 1:
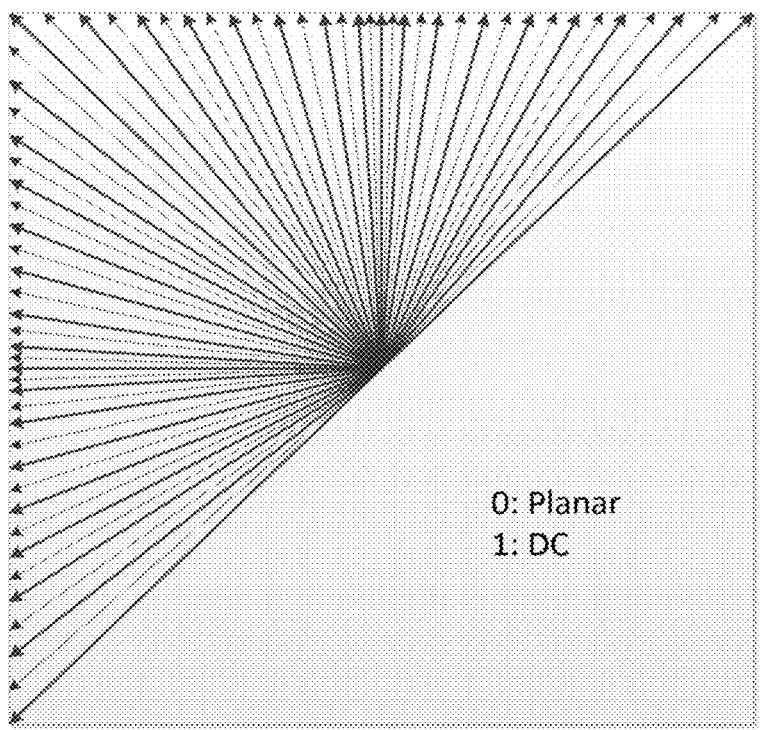
FIG. 1 shows a schematic diagram of a video coding block illustrating different known directional intra-prediction modes.
Figure 2:
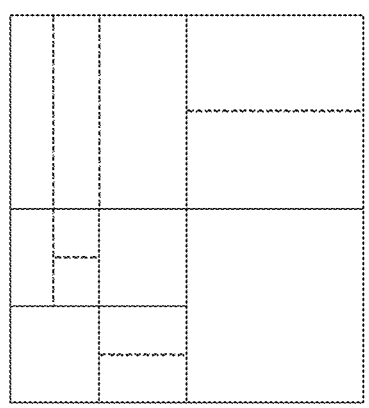
FIG. 2 shows a known example of block partitioning and a corresponding tree structure by using quad-tree plus binary-tree (QTBT)
Figure 2:
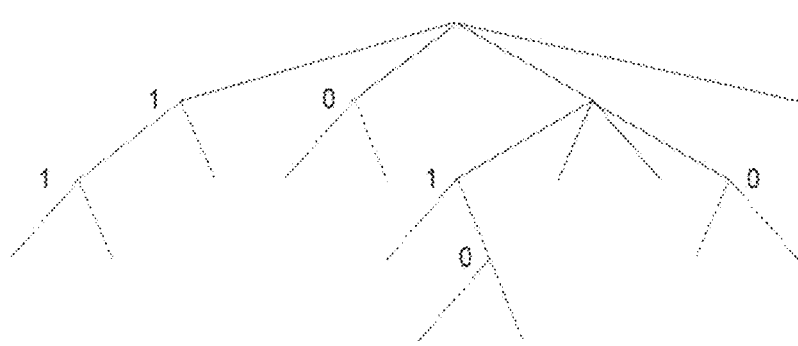
Figure 3:
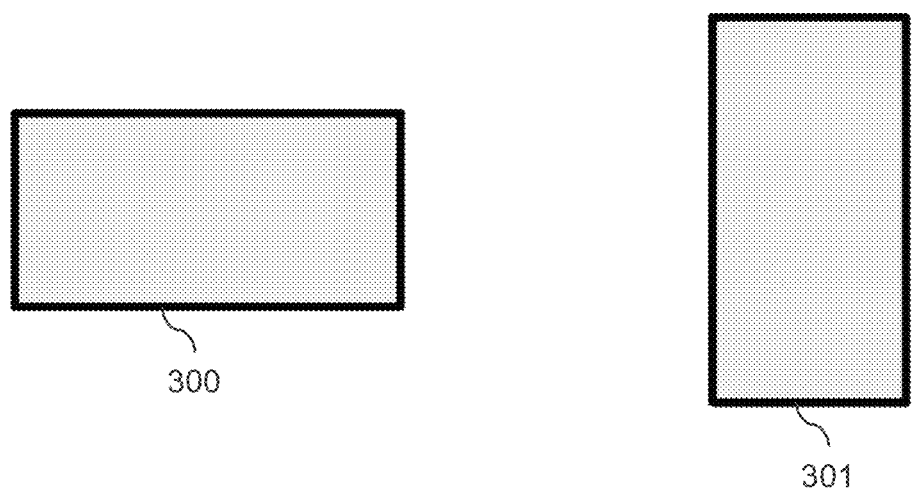
FIG. 3 shows example of blocks or video coding blocks generated by the known QTBT framework.
Figure 4A:
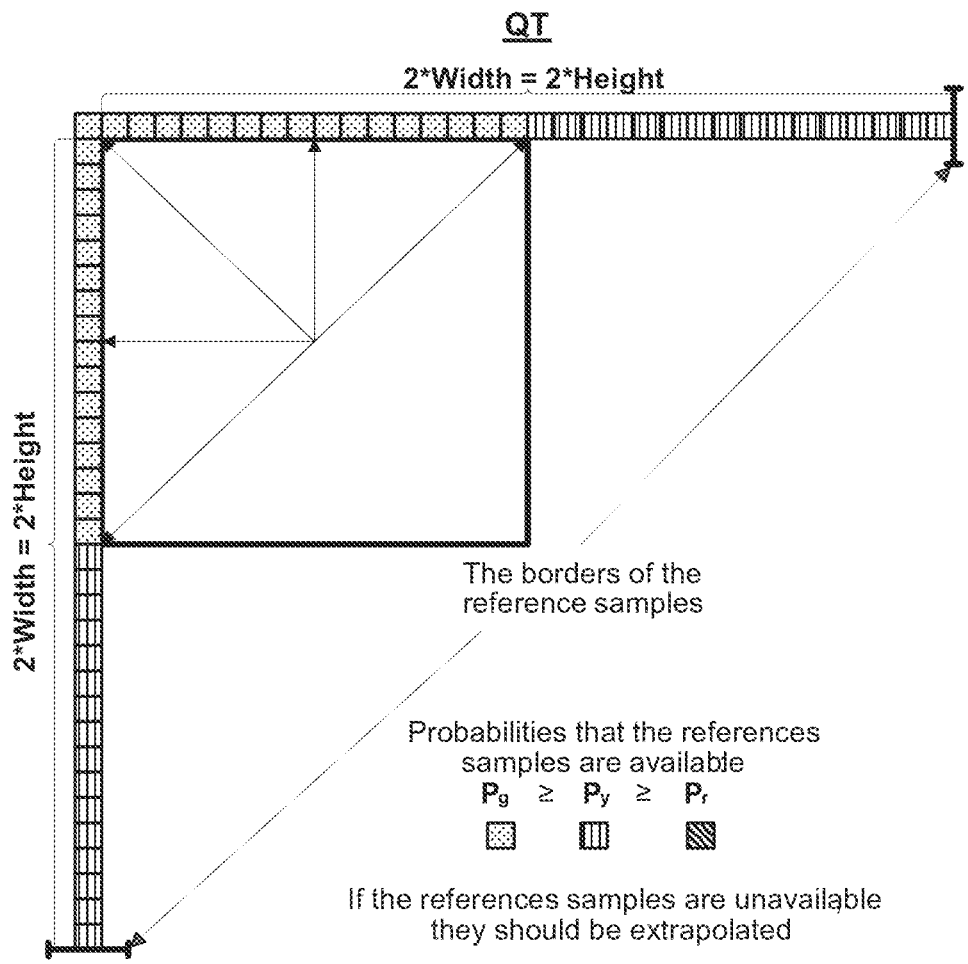
FIGS. 4a and 4b show known directional intra-prediction mechanisms in the QT and QTBT frameworks.
Figure 4B:
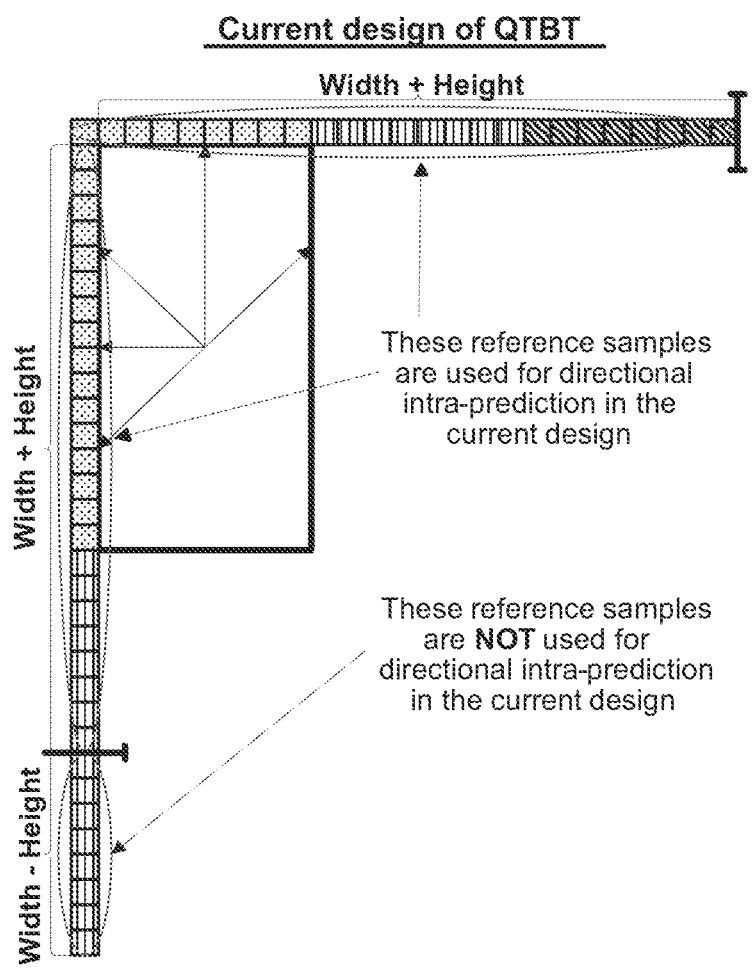
Figure 5:
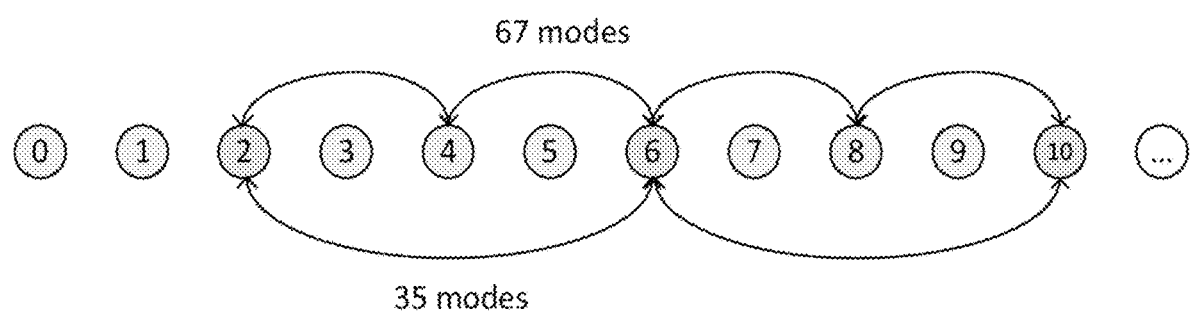
FIG. 5 shows the selection of the directional intra-prediction modes of the selected directional range according to an embodiment of the invention.

FIG. 5 shows the selection of the directional intra-prediction modes of the selected directional range according to an embodiment of the invention.

The selection of the directional intra-prediction modes can be based on the intra mode selection proposed in JVET-D0113 (V. Seregin, X. Zhao, and M. Karczewicz, "Variable number of intra modes", Contribution JVET-C0024 to the 4th JVET meeting, Chengdu, China, October 2016), which is a mechanism where the number of directional intra-prediction is adjustable. In particular, it proposes to further increase number of intra modes to 131 for large blocks sizes, while reducing the number of intra modes for small block sizes. The switching of intra modes number based on block sizes is controlled by two threshold values, which are signaled in SPS as log 2 values minus 4 and minus 6, respectively. The first threshold indicates the largest block size that can have 35 intra mode directions, and the second threshold indicates the largest block size that has 67 intra mode directions, all other blocks use 131 mode directions. In the default setting, thresholds are signaled as 4 and 6, respectively, and for higher resolution pictures it is set to 5 and 8.

In an implementation, an intra mode index is always represented by 131 mode range regardless of the number of intra modes actually used. For 67 modes being actually used, only every second angular mode is allowed, and for 35 modes, only every fourth angular mode is allowed. Therefore, during intra mode signaling, intra mode of the neighboring block may need to be rounded towards nearest second or fourth angular intra mode if the current block uses smaller than 131 intra mode directions as explained in FIG. 5. This conversion is done by applying right and left shifts of 1 or 2 to an intra mode. If mode is not most probably mode (MPM), the mode signaling is following the same process as in JEM-3.0 but with different number of intra modes. Planar and DC modes are kept unchanged and do not require mode conversion. To accommodate increased number of intra modes, 4-tap intra filters are extended from 1/32 to 1/64 fractional pel.

With regard to FIG. 5, if a variable number of directional modes is used, some conversions of mode indices can be needed to map a set of directional intra-prediction modes available for smaller blocks to a set of directional intra-prediction modes available for larger blocks and vice versa.

Figure 11:
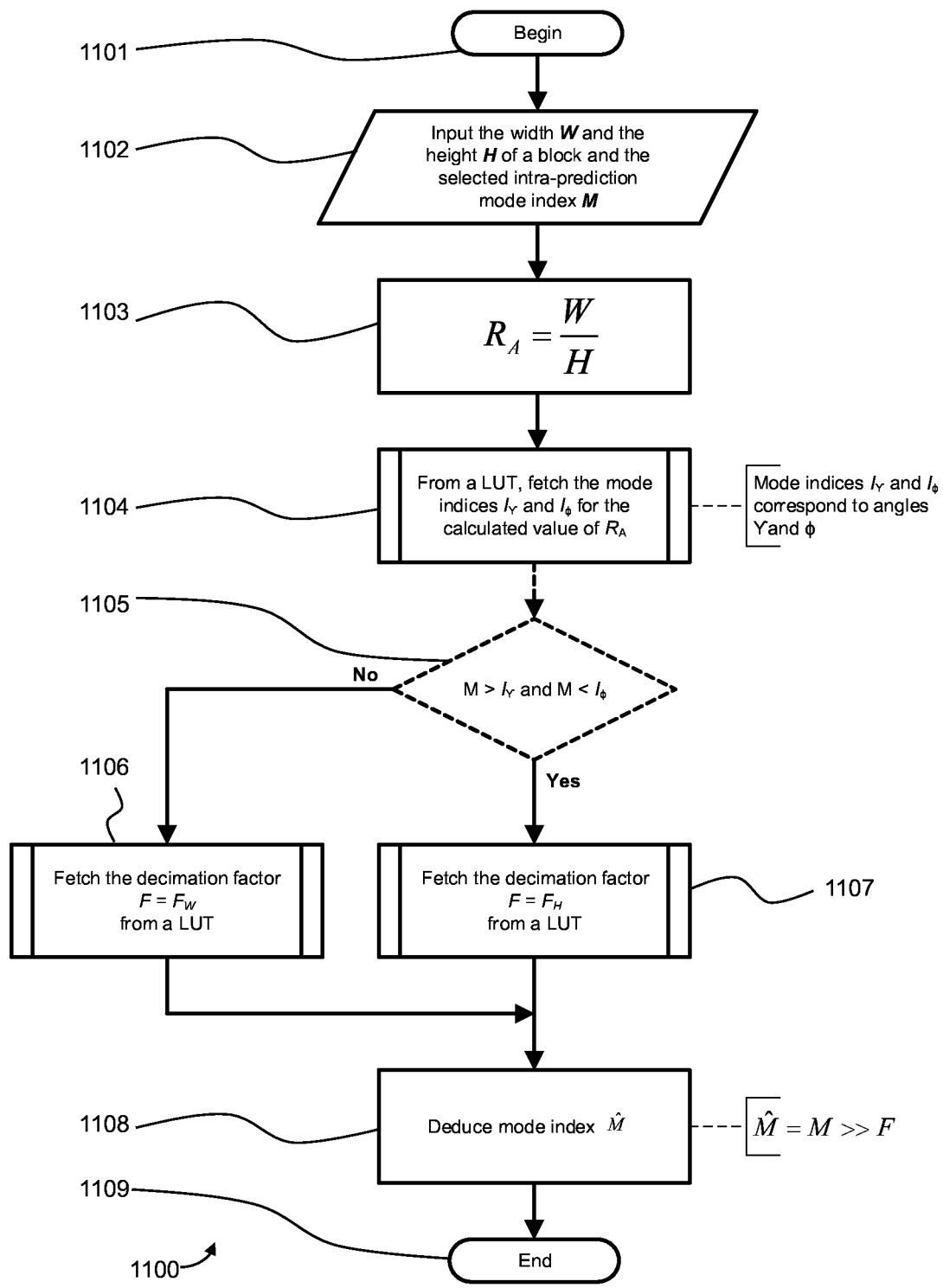
FIG. 11 shows a mapping process to map directional intra-prediction modes according to FIG. 9.

FIG. 11 shows a mapping process to map directional intra-prediction modes according to FIG. 9. The mapping process is used for deducing a directional intra-prediction mode index.

The mapping process 1100 is used to deduce 1108 a mode index $\hat{M}$.

In step 1102, the width and height of the block 900 and a selected intra-prediction mode index M are taken as input values.

In step 1103, the aspect ratio is computed.

In step 1104, a first look-up table (LUT) is used to fetch mode indices $I_\gamma$ and $I_\varphi$ corresponding to the angles of the delimiting directional intra-prediction modes 910, 918. These angles can be used to switch between different resolutions of directional intra-prediction modes as explained above.

In step 1105, it is checked whether the mode index M belongs to the short directional range 930.

Depending on the result of step 1105, a decimation factor is fetched from a given LUT. This decimation factor F is used to map the mode index M to the mode index $\hat{M}$ and depends on the length of a block side (width or height).

A decimation factor of 2 can e.g. mean that only every second angular mode is allowed, and a decimation factor of 4 can mean that only every fourth angular mode is allowed, as shown with respect to FIG. 5.

Figure 12:
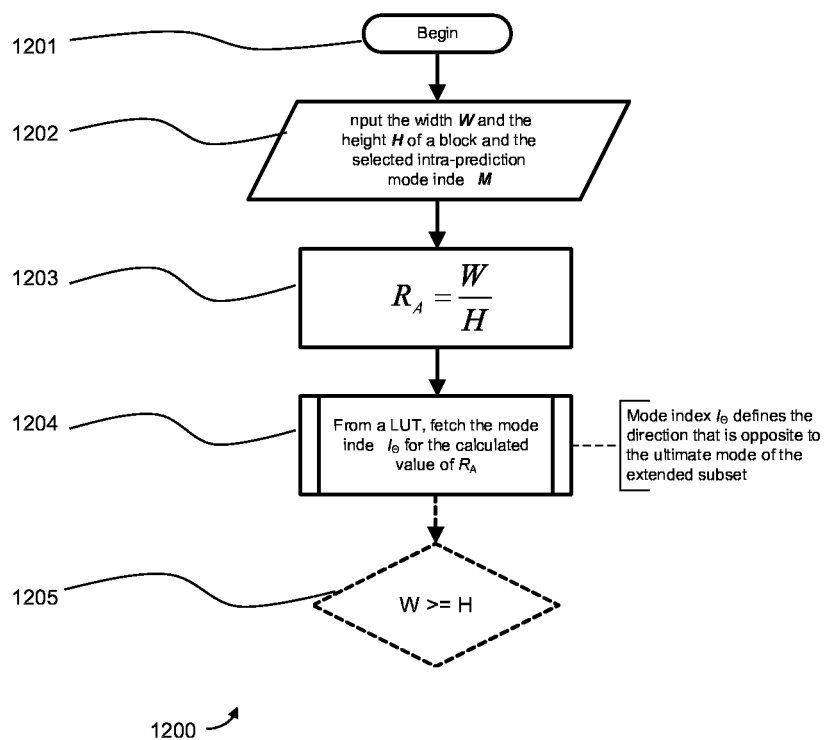
FIG. 12 (1/1) and FIG. 12 (2/2) are show a mapping process to map directional intra-prediction modes according to FIG. 10.
Figure 12:
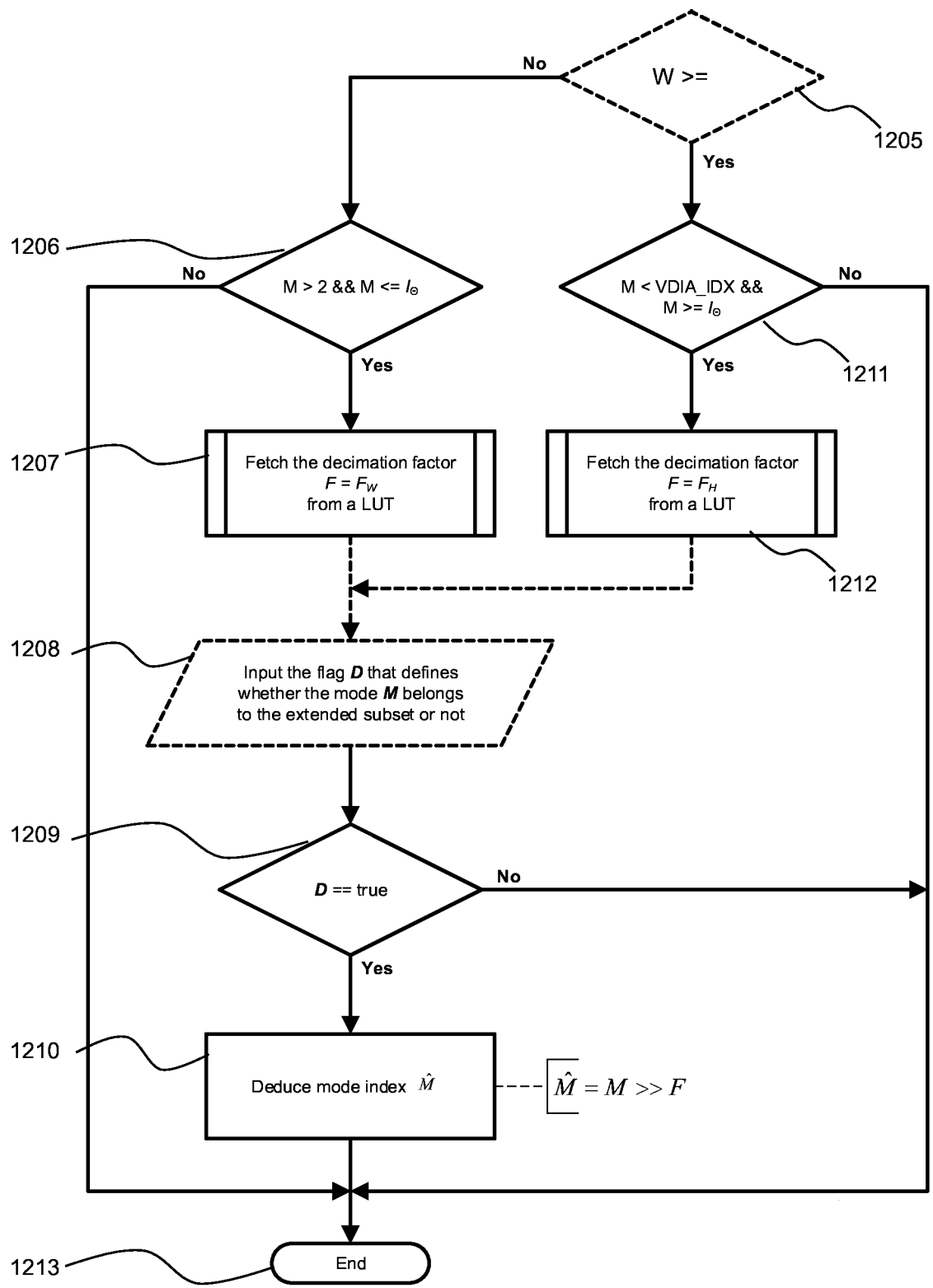

FIG. 12 shows a mapping process to map directional intra-prediction modes according to FIG. 10.

Similarly to FIG. 11, the mapping of mode index M to mode index $\hat{M}$ can be performed for the intra-prediction modes of the extension directional range shown in FIG. 10. Similarly to the general case of FIG. 10, two LUTs are required to fetch a mode index $I_\theta$ that depends on the aspect ratio $R_A$ of the block and is used to detect whether the mode falls into the extension directional range, for which the flag D is signaled or not, see steps 1208 and 1209. The flag D is mentioned in FIG. 7 as an additional flag and is needed to distinguish between conventional modes of the basis directional range 1031 and the additional ones that belong to the extension directional range 1032, or a decimation factor $\hat{F}$ that is used to map the mode index M to the mode index $\hat{M}$ and depends on the length of a block side (width or height), see steps 1207 and 1212.

The following table 1 provides examples of directional intra-prediction mode subsets that are available for different lengths of block sides and for different aspect rations of blocks. Diagonal mode with index $I_\gamma$ is not considered in the number of available directional intra-prediction mode per side for the general case.

TABLE 1

Examples of mode ranges available for different side lengths:

| | | The number of available directional intra-prediction modes | | | |
|---|---|---|---|---|---|
| Block width | Block height | General case (FIG. 9) $\langle M \rangle$, $m \in M$, $m < I_\gamma$ | General case (FIG. 9) $\langle M \rangle$, $m \in M$, $m > I_\gamma$ | Particular case (FIG. 10) $\Delta M_I$ | Total directional modes |
| 4 | 4 | 8 | 8 | 0 | 17 |
| 4 | 8 | 10 | 6 | 0 | 17 |
| 4 | 16 | 27 | 5 | 0 | 33 |
| 4 | 32 | 59 | 5 | 0 | 65 |
| 4 | 64 | 124 | 4 | 0 | 129 |
| 8 | 4 | 10 | 6 | 3 | 17 |
| 8 | 8 | 16 | 16 | 0 | 33 |
| 8 | 16 | 19 | 13 | 0 | 33 |
| 8 | 32 | 53 | 11 | 0 | 65 |
| 8 | 64 | 119 | 9 | 0 | 129 |
| 16 | 4 | 5 | 27 | 6 | 33 |
| 16 | 8 | 13 | 19 | 3 | 33 |
| 16 | 16 | 32 | 32 | 0 | 65 |
| 16 | 32 | 83 | 45 | 0 | 129 |
| 16 | 64 | 74 | 54 | 0 | 129 |
| 32 | 4 | 5 | 59 | 14 | 65 |
| 32 | 8 | 11 | 53 | 11 | 65 |
| 32 | 16 | 45 | 83 | 14 | 129 |

TABLE 1-continued

Examples of mode ranges available for different side lengths:

| | | The number of available directional intra-prediction modes | | | |
|---|---|---|---|---|---|
| Block width | Block height | General case (FIG. 9) $\langle M \rangle$, $m \in M$, $m < I_\gamma$ | General case (FIG. 9) $\langle M \rangle$, $m \in M$, $m > I_\gamma$ | Particular case (FIG. 10) $\Delta M_I$ | Total directional modes |
| 32 | 32 | 32 | 32 | 0 | 65 |
| 32 | 64 | 13 | 91 | 0 | 129 |
| 64 | 4 | 4 | 124 | 30 | 129 |
| 64 | 8 | 9 | 119 | 0 | 129 |
| 64 | 16 | 54 | 74 | 0 | 129 |
| 64 | 32 | 91 | 13 | 0 | 129 |
| 64 | 64 | 64 | 64 | 0 | 129 |

Particular values of indices of diagonal directions for the case of 131 intra prediction modes (129 of them are directional ones) are given in Table 2.

TABLE 2

Exemplary values of mode indices $I_\gamma$, $I_\varphi$ and $I_\theta$ mentioned in FIGS. 11 and 12

| Block aspect ratio | Values of mode index $I_\gamma$ | Values of mode indices $I_\varphi$ ($I_\theta$) |
|---|---|---|
| 1:2 (vertically oriented block) | 117 | 79 |
| 1:4 | 108 | 88 |
| 1:8 | 103 | 93 |
| 1:16 | 101 | 96 |
| 2:1 (horizontally oriented block) | 53 | 15 |
| 4:1 | 44 | 24 |
| 8:1 | 39 | 29 |
| 16:1 | 36 | 31 |

The main advantages of the invention are as follows, including a set of available directional intra-prediction modes is defined subject to the actual lengths of each block side and optionally to the aspect ratio a block, the proposed signaling mechanism uses not only the lengths of block sides but also the aspect ratio of a block to select what directional modes should be skipped, and the proposed invention can be applied to the extension directional range of directional intra-prediction modes.

Definitions of Acronyms and Glossary

ALF—Adaptive Loop Filter
AMT—Adaptive Multiple Transform
ARSS—Adaptive Reference Sample Smoothing
BD-Rate—Bjøntegaard Delta Rate
CABAC—Context-Adaptive Binary Arithmetic Coding
CAVLC—Context-Adaptive Variable Length Coding
CU—Coding Unit
CTU—Coding Tree Unit
DART—Direction-Adaptive Residual Transform
DBF—De-Blocking Filter
DCT—Discrete Cosine Transform
DST—Discrete Sine Transform
EIP—Enhanced Intra-Prediction
EMT—Enhanced Multiple Transform
HEVC—High-Efficiency Video Coding
ICT—Integer Cosine Transform
HM—HEVC Reference Model JEM—Joint Exploration Model
KLT—Karhunen-Loéve-Transform
KTA—Key Technical Area
LCS—Luminance Coding Speedup
LSB—Least Significant Bit
LUT—Look-Up Table
MDDT—Mode-Dependent Directional Transform
MDCS—Mode-Dependent Coefficient Scan
MPI—Multi-parameter Intra prediction
MSB—Most Significant Bit
MTT—Multi-Type Tree
PDPC—Position Dependent Intra Prediction Combination
PU—Prediction Unit
QT—Quad-Tree
QTBT—Quad-Tree Binary Tree
RD—Rate-Distortion
RD—cost-Rate-Distortion Cost
RDO—Rate-Distortion Optimization
RDOT—Rate-Distortion-Optimized Transform
RQT—Residual Quad-Tree
RSAF—Reference Sample Adaptive Filter
SAO—Sample Adaptive Offset
SBH—Sign Bits Hiding
TB—Transform Block
TU—Transform Unit
VTM—VVC Test Model
VVC—Versatile Video Coding, the standardization project developed by JVET
CTU—the root of a coding a structure of the video sequence of a pre-defined size, containing a part of a picture (e.g. 64×64 pixels). A CTU can be partitioned into CUs.
CU—a basic coding structure of the video sequence of a pre-defined size, containing a part of a picture, which is belonging to a CTU. A CU can be partitioned into further CUs.
PU—a coding structure which is the result of the partitioning of a CU. Can be partitioned to several TUs or coincide with a single TU.

While the invention has been illustrated and described in detail in the drawings and the foregoing description, such illustration and description are to be considered illustrative or exemplary and not restrictive. The invention is not limited to the disclosed embodiments. From reading the present disclosure, other modifications will be apparent to a person skilled in the art. Such modifications may involve other features, which are already known in the art and may be used instead of or in addition to features already described herein.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

What is claimed is:

1. A device, comprising:
a non-transitory computer-readable storage medium storing instructions; and
one or more processors in communication with the medium and, upon execution of the instructions, being configured to:
select a directional range from a set of directional ranges; and
determine a number of directional intra-prediction modes of the selected directional range according to a size of a block, wherein the block is a rectangular and non-square video coding block, the selected directional range comprises a basis directional range associated with a long side of the block, and further comprises an extension directional range that is associated with the long side of the block and that is dependent on an aspect ratio of the block, the extension directional range is outside of, and adjacent to the basis directional range along the long side of the block, and wherein the number of directional intra-prediction modes for the selected directional range comprises a number $\Delta M0$ of directional intra-prediction modes of the extension directional range, and wherein the number $\Delta M0$ of directional intra-prediction modes of the extension directional range is based on a lookup table having a plurality of numbers of directional intra-prediction modes for the extension directional range.

2. The device according to claim 1, wherein the one or more processors being configured to determine the number of directional intra-prediction modes comprises the one or more processors being configured to determine the number of directional intra-prediction modes of the selected directional range according to the size of the block and the aspect ratio of the block.

3. The device according to claim 1, wherein the one or more processors being configured to select the directional range comprises the processor being configured to select, from the set of directional ranges, a short directional range associated with a short side of the block and a long directional range associated with the long side of the block; and
wherein the one or more processors being configured to determine the number of directional intra-prediction modes comprises the one or more processors being configured to determine a number $\Delta M$short of directional intra-prediction modes of the short directional range and a number $\Delta M$long of directional intra-prediction modes of the long directional range according to:

$$\Delta M\text{long}/L\text{long} < \Delta M\text{short}/L\text{short};$$

wherein Lshort is a length of the short side of the block, and Llong is a length of the long side of the block.

4. The device according to claim 1, wherein the one or more processors being configured to select the directional range comprises the one or more processors being configured to select, from the set of directional ranges, a short directional range associated with a short side of the block, and a long directional range associated with the long side of the block; and
wherein the one or more processors being configured to determine the number of directional intra-prediction modes comprises the one or more processors being configured to determine a number $\Delta M$short of directional intra-prediction modes of the short directional range and a number $\Delta M$long of directional intra-prediction modes of the long directional range, wherein an angular resolution ARshort of the short directional range is higher than an angular resolution ARlong of the long directional range;
wherein an angular resolution ARG of a given directional range is proportional to a number $\Delta MG$ of directional intra-prediction modes of the given directional range, and is inversely proportional to an angle αG of the given directional range.

5. The device according to claim 4, wherein the angular resolution ARG of the given directional range is defined by:

ARG=ΔMG/αG.

6. The device according to claim 4, wherein two neighboring directional intra-prediction modes are at least one of two neighboring directional intra-prediction modes of the short directional range that are separated by a fixed angle β, or two neighboring directional intra-prediction modes of the long directional range that are separated by a fixed angle α.

7. The device according to claim 1, wherein the basis directional range and the extension directional range are disjoint;
wherein the one or more processors being configured to select the directional range comprises the one or more processors being configured to select the extension directional range; and
wherein the one or more processors being configured to determine the number of directional intra-prediction modes comprises the one or more processors being configured to determine the number ΔM0 of directional intra-prediction modes of the extension directional range according to a difference between a length L0/long of the long side of the block and a length L0/short of a short side of the block.

8. The device according to claim 1, wherein the basis directional range and the extension directional range are disjoint
wherein the one or more processors being configured to select the directional range comprises the one or more processors being configured to select the extension directional range, and
wherein the one or more processors being configured to determine the number of directional intra-prediction modes comprises the one or more processors being configured to determine the number ΔM0 of directional intra-prediction modes of the extension directional range.

9. The device according to claim 1, wherein the one or more processors being configured to determine the number of directional intra-prediction modes comprises the one or more processors being configured to:
determine the number of directional intra-prediction modes of the selected directional range from the lookup table according to a block width and block height.

10. The device according to claim 1, wherein the device is an encoding apparatus for encoding a rectangular and non-square video coding block; and
wherein the one or more processors, upon execution of the instructions, are further configured to:
provide a predicted video coding block; and
encode the video coding block into an encoded video bitstream according to of the predicted video coding block.

11. The device according to claim 1, wherein the device is a decoding apparatus for decoding an encoded video bitstream;
wherein the one or more processors, upon execution of the instructions, are further configured to:
provide a predicted video coding block; and
restore the rectangular and non-square video coding block from the encoded video bitstream according to the predicted video coding block.

12. A method, comprising:
selecting a directional range from a set of directional ranges, and
determining a number of directional intra-prediction modes of the selected directional range according to a size of a block, wherein the block is a rectangular and non-square video coding block, the selected directional range comprises a basis directional range associated with a long side of the block, and further comprises an extension directional range that is associated with the long side of the block and that is dependent on an aspect ratio of the block, wherein the extension directional range is outside of, and adjacent to the basis directional range along the long side of the block, wherein the number of directional intra-prediction modes for the selected directional range comprises a number ΔM0 of directional intra-prediction modes of the extension directional range, and wherein the number ΔM0 of directional intra-prediction modes of the extension directional range is based on a lookup table having a plurality of numbers of directional intra-prediction modes for the extension directional range.

13. The method of claim 12, wherein the determining the number of directional intra-prediction modes comprises determining the number of directional intra-prediction modes of the selected directional range according to the size of the block and the aspect ratio of the block.

14. The method of claim 12, wherein the
wherein the selecting the directional range comprises selecting, from the set of directional ranges, a short directional range associated with a short side of the block and a long directional range associated with the long side of the block; and
wherein the determining the number of directional intra-prediction modes determining a number ΔMshort of directional intra-prediction modes of the short directional range and a number ΔMlong of directional intra-prediction modes of the long directional range according to:

ΔMlong/Llong<ΔMshort/Lshort wherein Lshort is a length of the short side of the block, and Llong is a length of the long side of the block.

15. The method of claim 12, wherein the selecting the directional range comprises selecting, from the set of directional ranges, a short directional range associated with a short side of the block, and a long directional range associated with the long side of the block; and
wherein the determining the number of directional intra-prediction modes comprises determining a number ΔMshort of directional intra-prediction modes of the short directional range and a number ΔMlong of directional intra-prediction modes of the long directional range, wherein an angular resolution ARshort of the short directional range is higher than an angular resolution ARlong of the long directional range;
wherein an angular resolution ARG of a given directional range is proportional to a number ΔMG of directional intra-prediction modes of the given directional range, and is inversely proportional to an angle αG of the given directional range.

16. The method of claim 12, wherein the extension directional range is dependent on the aspect ratio of the block; and
wherein the basis directional range and the extension directional range are disjoint.

17. The method of claim 12, wherein the determining the number of directional intra-prediction modes comprises determining the number of directional intra-prediction modes of the selected directional range from the lookup table according to a block width and block height.

18. The method according to claim 12, further comprising encoding the rectangular and non-square video coding block, the encoding the rectangular and non-square video coding block comprising
   obtaining a predicted video coding block; and
   encoding the video coding block into an encoded video bitstream according to the predicted video coding block.

19. The method according to claim 12, further comprising decoding an encoded video bitstream, the decoding an encoded video bitstream comprising:
   obtaining a predicted video coding block; and
   restoring the rectangular and non-square video coding block from the encoded video bitstream according to the predicted video coding block.

20. A non-transitory computer readable medium having stored thereon instructions for execution by one or more processors, the instructions including instructions for:
   selecting a directional range from a set of directional ranges, and
   determining a number of directional intra-prediction modes of the selected directional range depending on a size of a block, wherein the block is a rectangular and non-square video coding block, the selected directional range comprises a basis directional range associated with a long side of the block, and further comprises an extension directional range that is associated with the long side of the block and that is dependent on an aspect ratio of the block, wherein the extension directional range is outside of, and adjacent to the basis directional range along the long side of the block, wherein the number of directional intra-prediction modes for the selected directional range comprises a number $\Delta M0$ of directional intra-prediction modes of the extension directional range, and wherein the number $\Delta M0$ of directional intra-prediction modes of the extension directional range is based on a lookup table having a plurality of numbers of directional intra-prediction modes for the extension directional range.

* * * * *